(12) United States Patent
Sekino et al.

(10) Patent No.: US 8,009,846 B2
(45) Date of Patent: *Aug. 30, 2011

(54) ULTRASONIC SPEAKER AND PROJECTOR

(75) Inventors: Hirokazu Sekino, Chino (JP); Kinya Matsuzawa, Shiojiri (JP); Yoshiki Fukui, Suwa (JP); Shinichi Miyazaki, Suwa (JP)

(73) Assignee: Seiko Epson Corporation (JP)

( * ) Notice: Subject to any disclaimer, the term of this patent is extended or adjusted under 35 U.S.C. 154(b) by 38 days.

This patent is subject to a terminal disclaimer.

(21) Appl. No.: 12/488,789

(22) Filed: Jun. 22, 2009

(65) Prior Publication Data

US 2009/0257606 A1 Oct. 15, 2009

Related U.S. Application Data

(63) Continuation of application No. 11/155,033, filed on Jun. 16, 2005, now Pat. No. 7,564,986.

(30) Foreign Application Priority Data

Jun. 21, 2004 (JP) .................................. 2004-182464

(51) Int. Cl.
*H04R 25/00* (2006.01)
*H05K 5/00* (2006.01)

(52) U.S. Cl. ........ 381/191; 381/150; 381/160; 381/163; 181/156

(58) Field of Classification Search .................... 381/191
See application file for complete search history.

(56) References Cited

U.S. PATENT DOCUMENTS

| 4,823,908 | A | * | 4/1989 | Tanaka et al. ................. 181/175 |
| 4,907,671 | A | * | 3/1990 | Wiley ........................... 181/155 |
| 5,970,158 | A | | 10/1999 | Beltran |
| 6,304,662 | B1 | | 10/2001 | Norris et al. |
| 6,584,206 | B2 | | 6/2003 | Ohashi |
| 6,643,377 | B1 | | 11/2003 | Takahashi et al. |

FOREIGN PATENT DOCUMENTS

| JP | 61-123389 | 6/1986 |
| JP | 2786531 | 5/1998 |
| JP | 2003-102084 | 4/2003 |

OTHER PUBLICATIONS

Yonezawa Yoshimichi, Translation for Patent Abstract for JP 200310284, Apr. 2003.*
Yonezawa Yoshimichi, Translation for Japanese Patent Publication JP 200310284, Apr. 2003.*

* cited by examiner

*Primary Examiner* — Curtis Kuntz
*Assistant Examiner* — Sunita Joshi
(74) *Attorney, Agent, or Firm* — Harness, Dickey & Pierce, P.L.C.

(57) ABSTRACT

An ultrasonic speaker including: a vibration film having a conductive layer; a pair of fixed electrodes provided oppositely to respective surfaces of the vibration film; and an ultrasonic transducer that causes the vibration film to generate sound waves by applying a DC bias voltage to the conductive layer of the vibration film while applying an alternating signal between the pair of fixed electrodes, and outputs the sound waves generated by the vibration film from two sound wave output surfaces via through-holes provided in each of the pair of fixed electrodes. The two sound wave output surfaces of the ultrasonic transducer are disposed in a direction intersecting with a sound wave emitting direction at right angles.

4 Claims, 11 Drawing Sheets

| CARRIER WAVE FREQUENCY (kHz) | HALF WAVELENGTH (mm) |
|---|---|
| 20 | 8.5 |
| 40 | 4.25 |
| 60 | 2.833333333 |
| 80 | 2.125 |
| 100 | 1.7 |

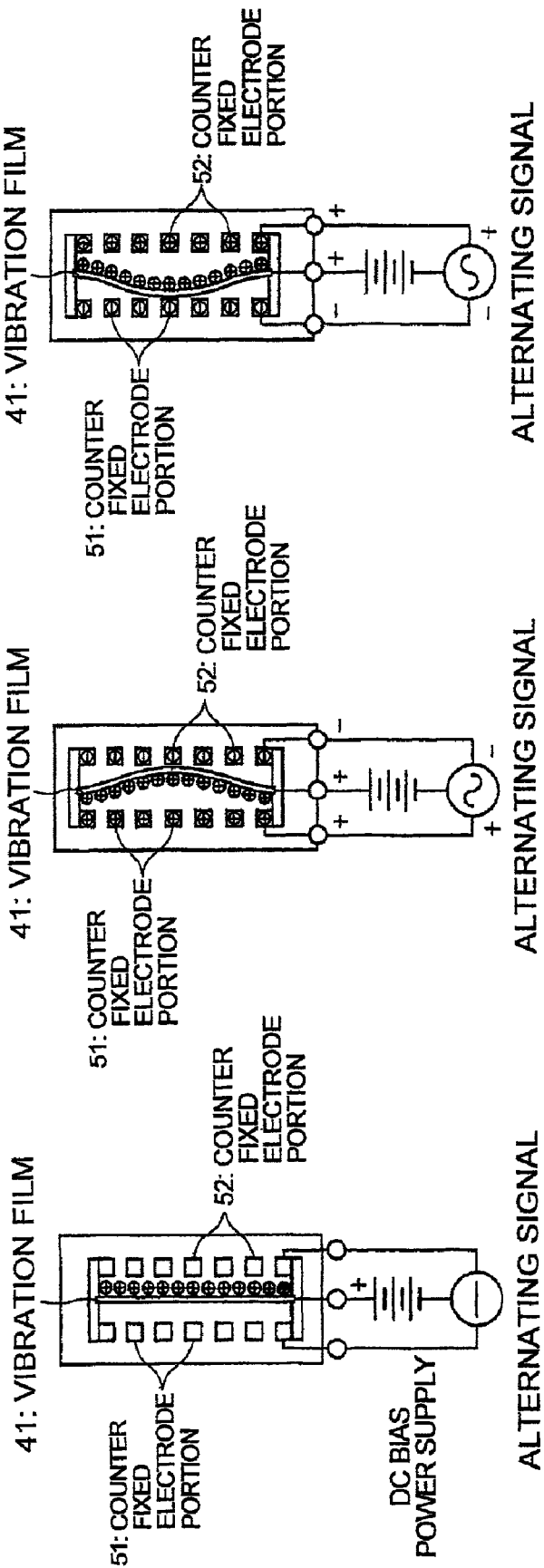

ULTRASONIC SPEAKER AND PROJECTOR

CROSS REFERENCE TO RELATED APPLICATIONS

This is a continuation application of U.S. Ser. No. 11/155,033 filed Jun. 16, 2005, claiming priority to Japanese Patent Application No. 2004-182464 filed Jun. 21, 2004 all of which are hereby expressly incorporated by reference.

BACKGROUND

1. Technical Field

The present invention relates to an ultrasonic speaker and a projector incorporating the ultrasonic speaker, and more particularly, to an ultrasonic speaker capable of utilizing all the sound waves emitted from both sound wave output surfaces of a push-pull electrostatic ultrasonic transducer as a sound source and a projector.

2. Related Art

Recently, applications related to a combination of speakers having a parametric effect that uses the non-linearity of air with respect to ultrasonic waves and a reflection plate that reflects audible sound waves have been filed.

For example, a structure in which a reflection plate and an ultrasonic transducer array are incorporated into a speaker box is disclosed as an invention. According to the structure of this invention, however, sound wave output surfaces of the ultrasonic transducer array are not spaced at regular intervals with respect to the reflection surface, which poses a problem that sound pressures of reflected sounds are not uniform (for example, see JP-A-61-123389).

An invention to solve this problem has been also disclosed (for example, see Japanese Patent No. 2786531). This invention solves the problem by forming an ultrasonic transducer array on a concave surface of a parabolic substrate having an opening at the center, and providing a reflection plate for audible sound waves in the vicinity of the center point of the radius of curvature of the substrate so that secondary waves (audible sound waves) having a strong directivity are reflected on the reflection plate to be emitted through the hole (opening) provided at the center of the parabolic substrate.

However, these two methods relate to a transducer having a single sound wave output surface, and sound waves emitted to the backside have not been used effectively in a push-pull electrostatic transducer of such a structure that sound waves are output in directions toward both surfaces of the transducer.

FIGS. 10A through 10C are views used to describe the driving concept of a push-pull electrostatic ultrasonic transducer. The push-pull electrostatic ultrasonic transducer is provided with a pair of a counter fixed electrode portion 51 and a counter fixed electrode portion 52 each opposing a vibration film 41. A plus (+) DC bias is applied to the vibration film 41 from a DC bias power supply, whereas an alternating signal is applied between the counter fixed electrode portion 51 and the counter fixed electrode portion 52.

FIG. 10A is a view showing an amplitude state of the vibration film 41 when an alternating signal is zero (0). In this state, the vibration film 41 is present at a neutral position (at the middle between the counter fixed electrode portion 51 and the counter fixed electrode portion 52). FIG. 10B is a view showing an amplitude state of the vibration film 41 when a plus (+) voltage of an alternating signal is applied to the counter fixed electrode portion 51 while a minus (−) voltage of the alternative signal is applied to the counter fixed electrode portion 52. In this state, the center of the vibration film 41 is attracted in a direction toward the counter fixed electrode portion 52 by an electrostatic force (attraction force) induced between the vibration film 41 and the counter fixed electrode portion 52 and an electrostatic force (repulsive force) induced between the vibration film 41 and the counter fixed electrode portion 51.

FIG. 10C is a view showing an amplitude state of the vibration film 41 when a minus (−) voltage of an alternating signal is applied to the counter fixed electrode portion 51 while a plus (+) voltage of the alternating signal is applied to the counter fixed electrode portion 52. In this state, the center of the vibration film 41 is attracted in a direction toward the counter fixed electrode portion 51 by an electrostatic force (attraction force) induced between the vibration film 41 and the counter fixed electrode portion 51 and an electrostatic force (repulsive force) induced between the vibration film 41 and the counter fixed electrode portion 52. In this manner, the vibration film 41 vibrates in response to an alternating signal and thereby generates sound waves. The sound waves generated by the vibration film 41 are emitted in directions toward both surfaces, respectively, on the sides of the counter fixed electrode portion 51 and the counter fixed electrode portion 52.

When the push-pull ultrasonic transducer of a structure wherein sound waves are output in directions toward both surfaces in this manner is used, either sound waves outputted from both surfaces of the fixed electrode 50 are emitted (leaked) intact as is shown in FIG. 11A, or sound waves outputted from the counter fixed electrode portion 52 are attenuated by an absorber 90 as is shown in FIG. 11B. Therefore, the ultrasonic speaker is not configured to fully use all the sound waves outputted from the ultrasonic transducer.

In addition, as is shown in FIG. 12A, an ultrasonic speaker in the related art is of a circular shape, and it is incorporated into the projector in a standing posture with its sound wave output surface facing toward the front. Hence, when a reflection plate 60a is provided behind the circular fixed electrode 50, the reflection plate 60a needs to have a diameter twice as large as the diameter of the fixed electrode 50, which makes it difficult to easily fold the reflection plate 60a. This poses a problem in that the projector is increased in size or outputs of the ultrasonic speakers are insufficient (FIG. 12B shows a mode when the ultrasonic transducers shown in FIG. 12A are incorporated into the projector).

SUMMARY

An advantage of the invention is that it is possible to provide an ultrasonic speaker capable of utilizing all the sound waves emitted from both sound wave output surfaces of a push-pull electrostatic ultrasonic transducer as a sound source and a projector.

An ultrasonic speaker according to an aspect of the invention includes: a vibration film having a conductive layer; a pair of fixed electrodes provided oppositely to respective surfaces of the vibration film; and an ultrasonic transducer that causes the vibration film to generate sound waves by applying a DC bias voltage to the conductive layer of the vibration film while applying an alternating signal between the pair of fixed electrodes, and outputs the sound waves generated by the vibration film from two sound wave output surfaces via through-holes provided in each of the pair of fixed electrodes. The two sound wave output surfaces of the ultrasonic transducer are disposed in a direction intersecting with a sound wave emitting direction at right angles. Also, sound wave reflection plates are provided to both of the two sound wave output surfaces of the ultrasonic transducer, so that the sound waves outputted from each of the two sound wave output surfaces are reflected in the sound wave emitting direction.

When configured in this manner, in an ultrasonic speaker using a push-pull electrostatic ultrasonic transducer having two sound wave output surfaces, the ultrasonic transducer is disposed in such a manner that these sound wave output surfaces of the ultrasonic transducer are oriented in a direction that intersects with a sound wave emitting direction of the ultrasonic speaker. The sound wave reflection plates are then provided to both of the two sound wave output surfaces, so that the sound waves outputted from each of the two sound wave output surfaces are reflected in the sound wave emitting direction of the ultrasonic speaker.

The push-pull ultrasonic speaker is thus able to utilize (sound waves outputted from not only one of the two sound wave output surfaces but also the other one of the two sound wave output surface, which is not utilized, discarded in the related art). It is thus possible to enhance the output sound pressures, and consequently, a speaker having a satisfactory directivity can be fabricated.

In the ultrasonic speaker according to another aspect of the invention, the ultrasonic transducer is disposed in one of the following manners: (1) the two sound wave output surfaces are set to be parallel to a horizontal plane; and (2) the two sound wave output surfaces are set to be perpendicular to the horizontal plane.

When configured in this manner, in a case where the ultrasonic speaker is fabricated, it is possible to choose whether the sound output surfaces of the ultrasonic transducer are set to be parallel to the horizontal plane, or the sound output surfaces of the ultrasonic transducer are set to be perpendicular to the horizontal plane.

This configuration can increase a degree of freedom in the attachment direction when the ultrasonic speaker is incorporated into a device (for example, a projector).

The ultrasonic speaker according to a further aspect of the invention further includes a unit that adjusts an attachment angle of the sound wave reflection plates variably with respect to the two sound wave output surfaces of the ultrasonic transducer.

When configured in this manner, the attachment angle between the sound wave reflection plates and the two sound wave output surfaces can be adjusted variably. Sound waves reflected on the sound wave reflection plates are therefore adjusted to travel in the sound wave emitting direction.

In the ultrasonic speaker according to a still further aspect of the invention, an attachment angle of the sound wave reflection plates with respect to the two sound wave output surfaces of the ultrasonic transducer is set to 45 degrees or nearly 45 degrees.

When configured in this manner, an angle between the sound wave reflection plates and the two sound wave output surfaces can be set to 45 degrees or nearly 45 degrees. Sound waves reflected on the sound wave reflection plates are thereby adjusted to travel in the sound wave emitting direction.

The ultrasonic speaker according to a still further aspect of the invention further includes a moving mechanism control unit that shifts a position of the sound wave reflection plate on a side of one of the two sound wave output surfaces with respect to a position of the sound wave reflection plate on a side of the other one of the two sound wave output surfaces by a half wavelength of a frequency of a carrier wave in a direction perpendicular to the two sound wave output surfaces.

When configured in this manner, a moving mechanism (sliding mechanism) is provided to the sound wave reflection plate on one side to shift a distance d (a distance from a vibration film) by a half wavelength to be matched with the frequency of a carrier wave.

It is thus possible to bring sound waves outputted from the sound wave output surfaces on both sides in phase, which can in turn further enhance output sound pressure by preventing sound pressures from canceling each other out in the vicinity of the central axis.

In the ultrasonic speaker according to a still further aspect of the invention, the sound wave reflection plates are formed to be foldable to allow the ultrasonic speaker to collapse.

When configured in this manner, the reflection plates can be folded when the ultrasonic speaker is collapsed. Because the reflection plates can be readily folded, the ultrasonic speaker can be readily collapsed in the projector.

The ultrasonic speaker according to a still further aspect of the invention further includes a curved reflection plate that reflects sound wave components, which have been reflected on the sound wave reflection plates in a direction other than the sound wave emitting direction, in the sound wave emitting direction.

When the sound wave reflection plates are flat plates, part of sound waves emitted from the ultrasonic transducer fail to go incident on the sound wave reflection plates perpendicularly, and such sound waves are reflected in a vertical direction instead of being emitted forward by reflection. However, as is with the configuration described above, by further providing a curved reflection plate (a conical shape is preferable) to the plane reflection plate, it is possible to reflect components, which have been reflected on the plane reflection plate in a direction shifted from the desired direction (toward the front), on the curved reflection plate to travel toward the front.

Sound waves on one side that are not utilized and discarded in the related art can be thus utilized effectively.

A projector according to a still further aspect of the invention is a projector incorporating ultrasonic speakers according to any of the aspects described above.

When configured in this manner, the ultrasonic speaker according to an aspect of the invention is incorporated into the projector. Because output sound pressures of the ultrasonic speaker incorporated into the projector can be enhanced, the directivity of the speaker can be enhanced as well.

BRIEF DESCRIPTION OF THE DRAWINGS

The invention will be described with reference to the accompanying drawings, wherein like numbers reference like elements, and wherein:

FIGS. 10A through 10C are views used to describe the driving concept of a push-pull electrostatic ultrasonic transducer;

DESCRIPTION OF THE EMBODIMENTS

A best mode for carrying out the invention will now be described with reference to the accompanying drawings.

Figure 1:
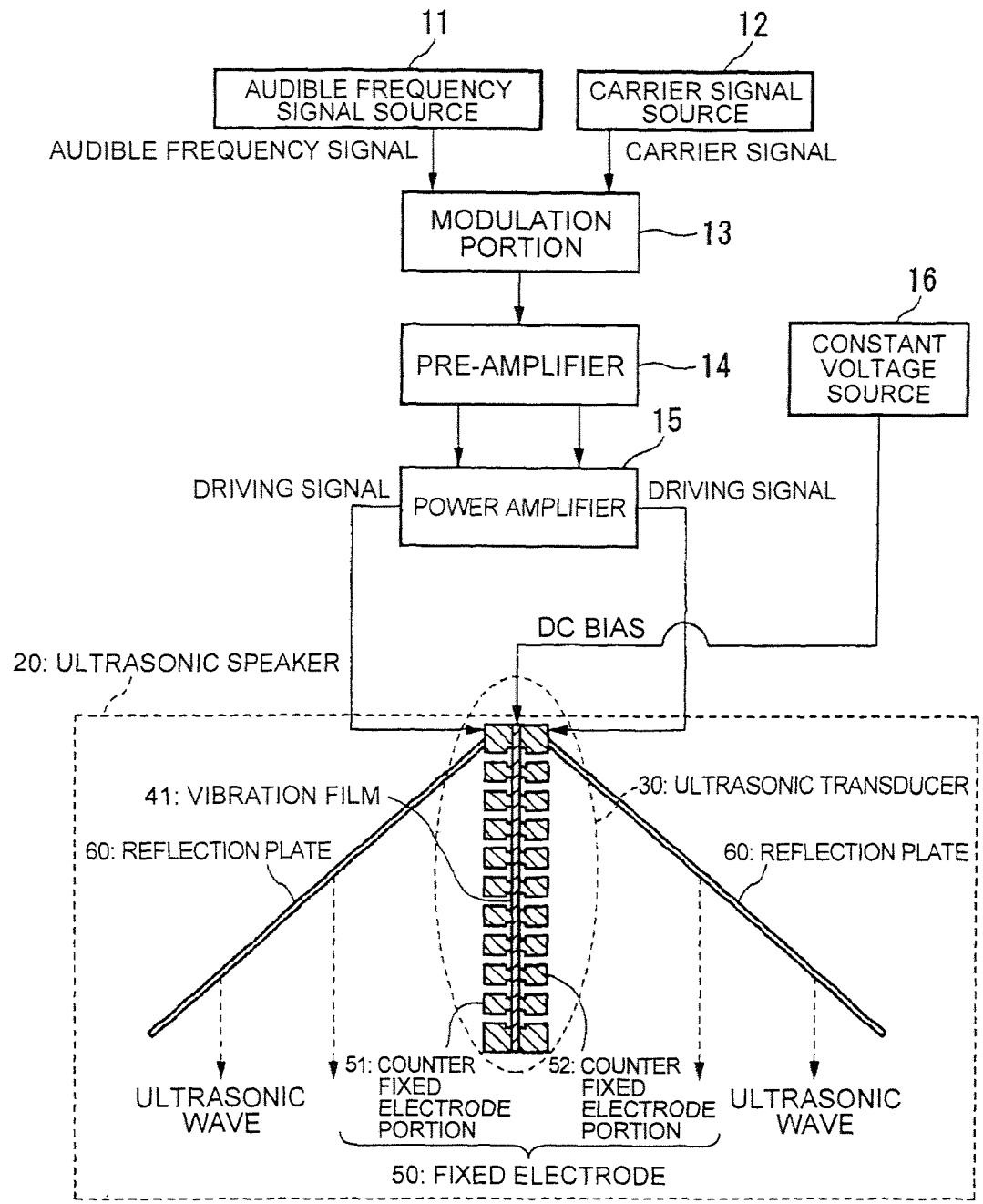
FIG. 1 is a view showing an example of the configuration of an ultrasonic speaker of the invention.

FIG. 1 is a view showing an example of the configuration of an ultrasonic speaker of the invention. Referring to FIG. 1, an audible frequency signal source 11 generates an audible frequency signal (for example, an audio signal). A carrier signal source 12 generates a carrier signal (carrier wave signal) in an ultrasonic frequency band. A modulation portion 13 modulates a carrier signal in the ultrasonic frequency band generated in the carrier signal source 12 into an audible frequency signal. A pre-amplifier 14 pre-amplifies a modulated signal, and a power amplifier 15 further amplifies the modulated signal. An ultrasonic transducer 30 converts the modulated signal amplified by the power amplifier 15 into a sound wave (ultrasonic wave) and emits the sound wave into air.

Ultrasonic waves emitted from the ultrasonic transducer 30 undergo the parametric effect while propagating into the air, and they are demodulated into audible frequency sound waves by themselves to allow individuals to hear them as audible sounds.

The ultrasonic transducer 30 is formed of a vibration film 41, and a fixed electrode 50 comprising a pair of counter fixed electrode portions (a pair of fixed electrodes) 51 and 52 each opposing the vibration film 41. The ultrasonic transducer 30 is of the push-pull structure in which the vibration film 41 is pinched between the two counter fixed electrode portions 51 and 52. A reflection plate 60 is provided on either side of the fixed electrode 50 forming the ultrasonic transducer 30.

Referring to FIG. 1, the ultrasonic transducer 30 and the reflection plates 60 are shown in sectional view. In the actual configuration, the vibration film 41, the fixed electrode 50, and the reflection plates 60 have a spatial expanse in a direction perpendicular to the sheet surface of the drawing (see an example of the structure of the fixed electrode shown in FIG. 9A).

Figure 2:
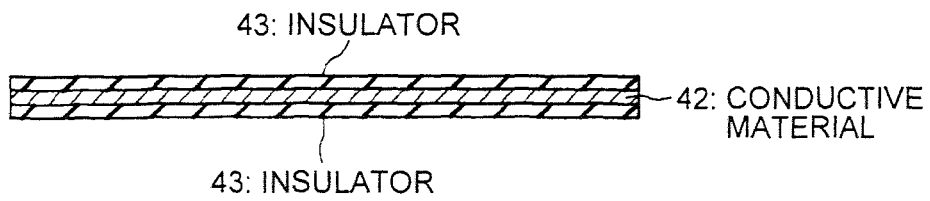
FIG. 2 is a view showing an example of the configuration of a vibration film.

FIG. 2 is a view showing an example of the configuration of the vibration film 41. The vibration film 41 is of a structure in which a conductive material (conductive layer) 42 is sandwiched between insulators 43.

Referring to FIG. 1 again, a bias voltage of a single polarity, that is, either a plus (+) or minus (−) voltage, is applied to the vibration film 41 by a constant voltage source 16 (the conductive layer in the vibration film 41 is charged), whereas an alternating signal outputted from the power amplifier 15 is applied to the two counter fixed electrode portions 51 and 52, so that the polarities are switched alternately. This configuration allows an attraction function and a repulsion function induced by an electrostatic force to act on the vibration film 41 simultaneously, thereby causing the vibration film 41 to vibrate.

Figure 3:
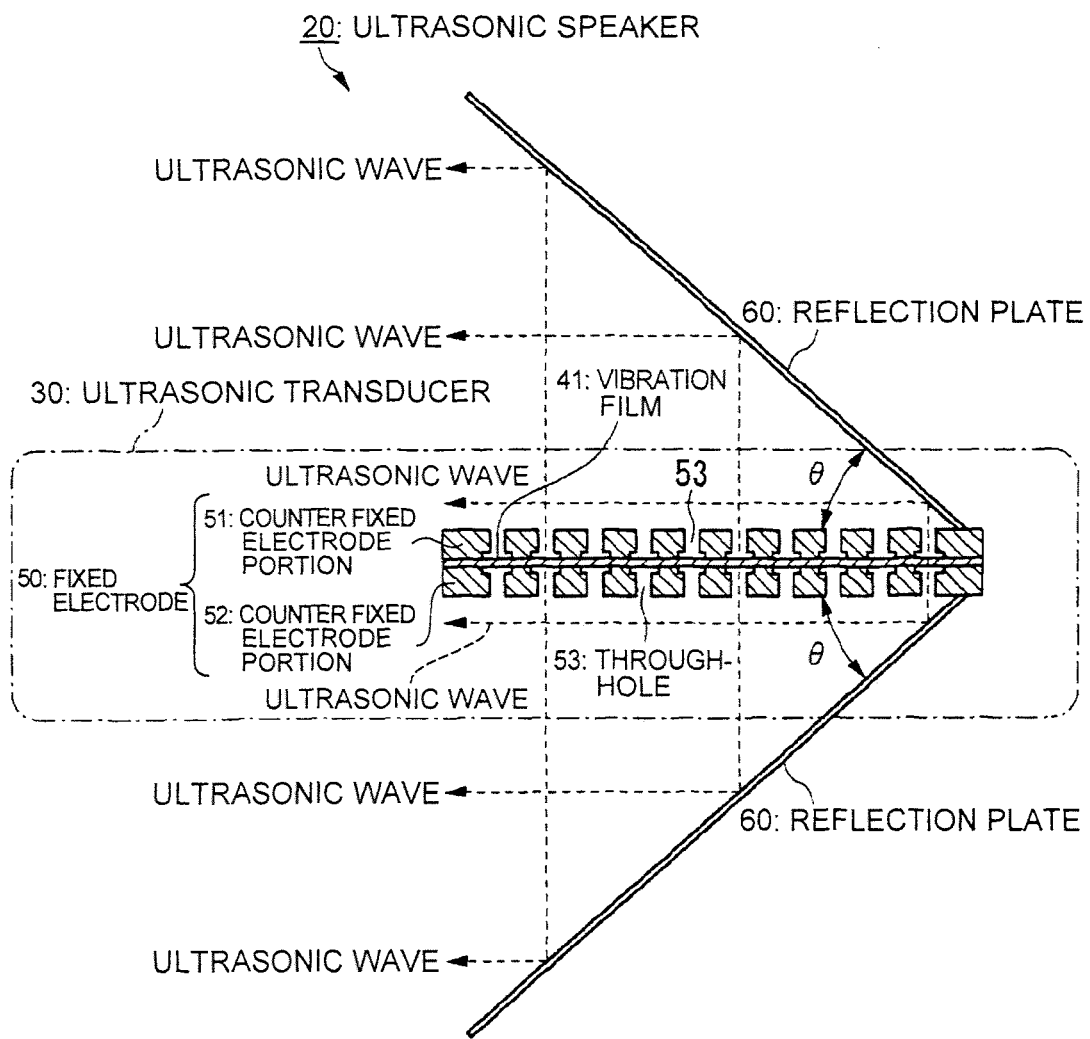
FIG. 3 is a view showing an example of the configuration of an ultrasonic transducer and reflection plates.

FIG. 3 is a view showing an example of the configuration of an ultrasonic transducer and reflection plates, and it shows a portion of the ultrasonic transducer 30 and the reflection plates 60. As has been described, the fixed electrode 50 comprises the counter fixed electrode portion 51 and the counter fixed electrode portion 52 each opposing the vibration film 41. Also, the counter fixed electrode portions 51 and 52 are provided with through-holes 53 of an identical shape at the same positions (at the same, corresponding positions). The vibration film 41 is held in a structure in which it is pinched between these counter fixed electrode portions 51 and 52. Sound waves generated as the vibration film 41 vibrates are emitted into air through the through-holes 53.

The reflection plate 60 is provided on either side of the fixed electrode 50, and an attachment angle (θ) of each reflection plate 60 with respect to the sound wave output surface of the fixed electrode 50 is adjustable. Generally, the reflection plates 60 are attached at an angle of 45 degrees (approximately 45 degrees) with respect to the sound wave output surfaces, so that the traveling direction of the sound waves is changed to a direction that intersects with the sound output surfaces at right angles by the reflection plates 60. Sounds are thereby emitted in a desired sound wave emitting direction (toward the front).

In this instance, because sound waves emitted from the respective two surfaces are in opposite phases, there is a possibility that part of the sound pressures may not be enhanced in the vicinity (near the center) of the ultrasonic transducer. However, the sound pressures as a whole can be enhanced in comparison with a case where sound waves are emitted from the one surface alone as in the related art.

Figures 4A, 4B:
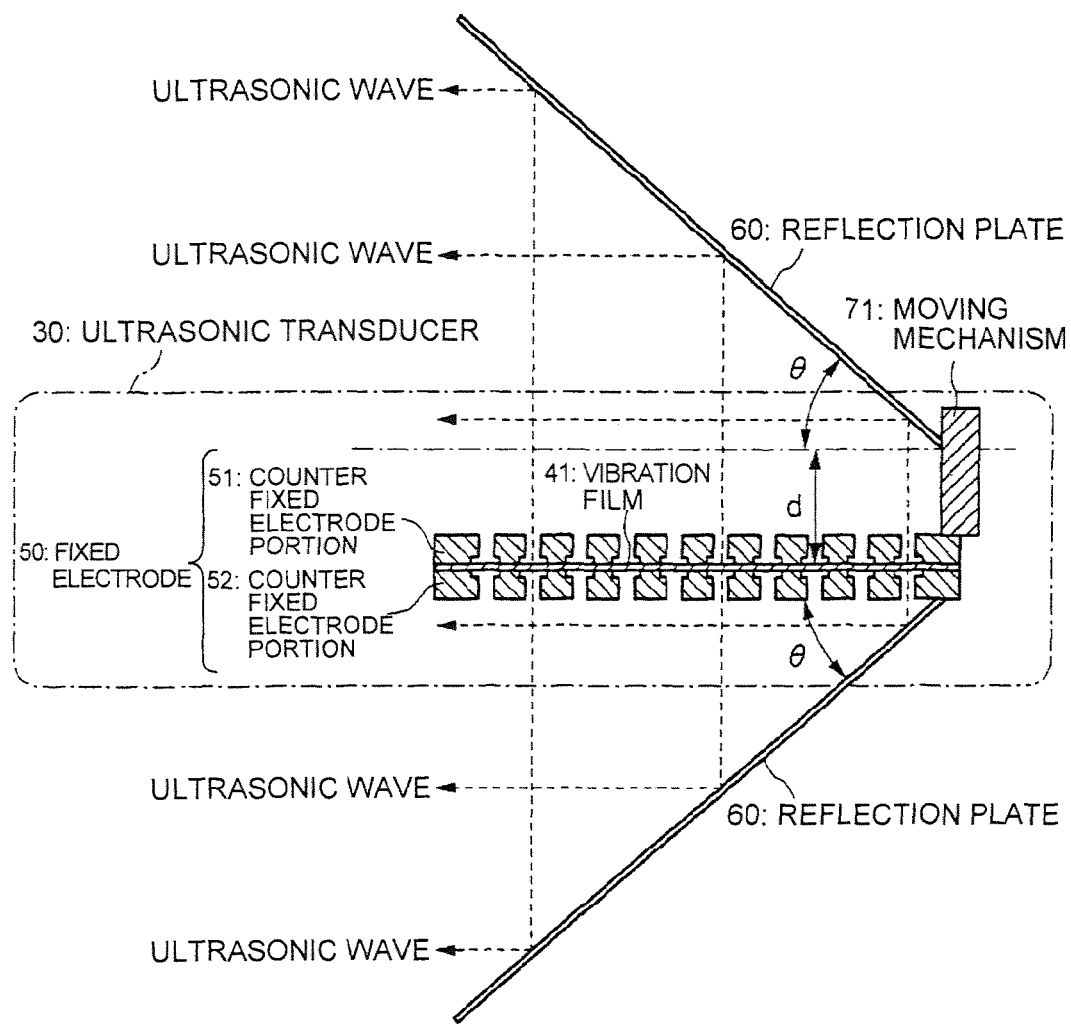
FIGS. 4A and 4B are views showing a second example of the configuration of the ultrasonic speaker of the invention.

FIGS. 4A and 4B are views showing a second example of the configuration of the ultrasonic speaker of the invention, and they show an example of the configuration to eliminate an event wherein part of sound pressures are cancelled out with each other in the vicinity (near the center) of the ultrasonic transducer of the configuration shown in FIG. 3. In the example of the configuration shown in FIG. 4A, a distance d between the vibration film 41 and the reflection plate 60 on the side of the counter fixed electrode portion 51 is shifted by a half wavelength to be matched with the frequency of the carrier wave (carrier signal). Alternatively, a distance between the vibration film 41 and the reflection plate 60 may be shifted on the side of the counter fixed electrode portion 52.

FIG. 4B shows a relation between the carrier wave frequency (carrier signal frequency) and a half-of-wavelength distance.

By shifting the reflection plate on one side by a half cycle (=half wavelength) of the carrier wave in this manner, it is possible to bring the sound waves outputted from the counter fixed electrodes 51 and 52 on both sides in phase, which can in turn further enhance sound pressures by preventing sound pressures from canceling each other out in the vicinity of the central axis.

Figure 5:
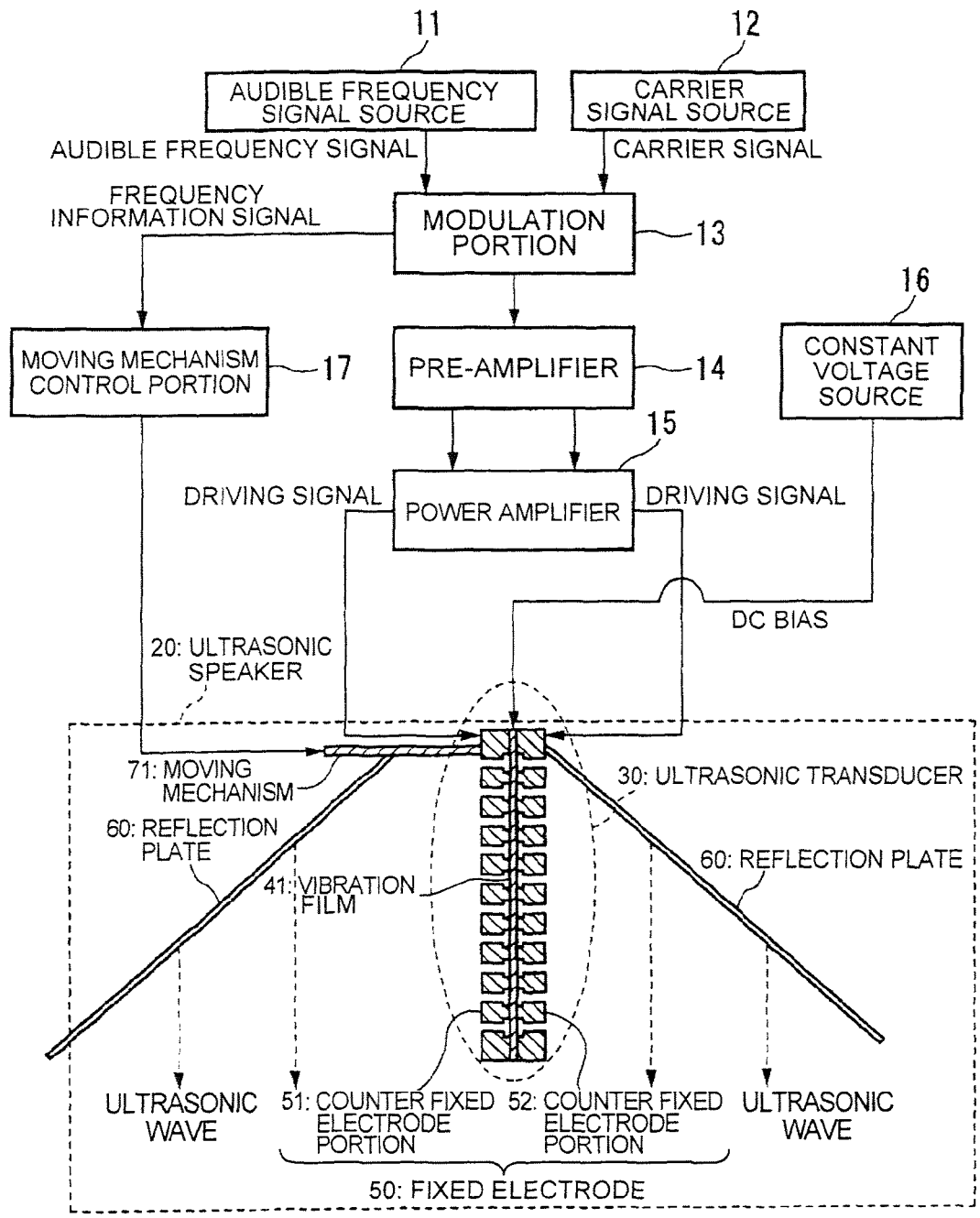
FIG. 5 is a view showing an example of a control circuit of the ultrasonic speaker shown in FIG. 4A.

FIG. 5 is a view showing an example of a control circuit of the ultrasonic speaker shown in FIG. 4A. Because the frequency of a carrier wave signal (carrier signal) is determined at the stage of demodulation processing, as is shown in FIG. 5, an information signal on the frequency (frequency information signal) is sent from the modulation portion 13 to a moving mechanism control portion (moving mechanism control unit) 17. The moving mechanism control portion 17 calculates a quantity of a half wavelength (=a quantity of movement) depending on the frequency on the basis of the information signal (frequency information signal), and then drives a moving mechanism (moving mechanism control unit) 71.

When configured in this manner, sound waves on both sides can be brought in phase, which can in turn further enhance sound pressured by preventing sound pressures from canceling each other out in the vicinity of the central axis.

Figure 6A:
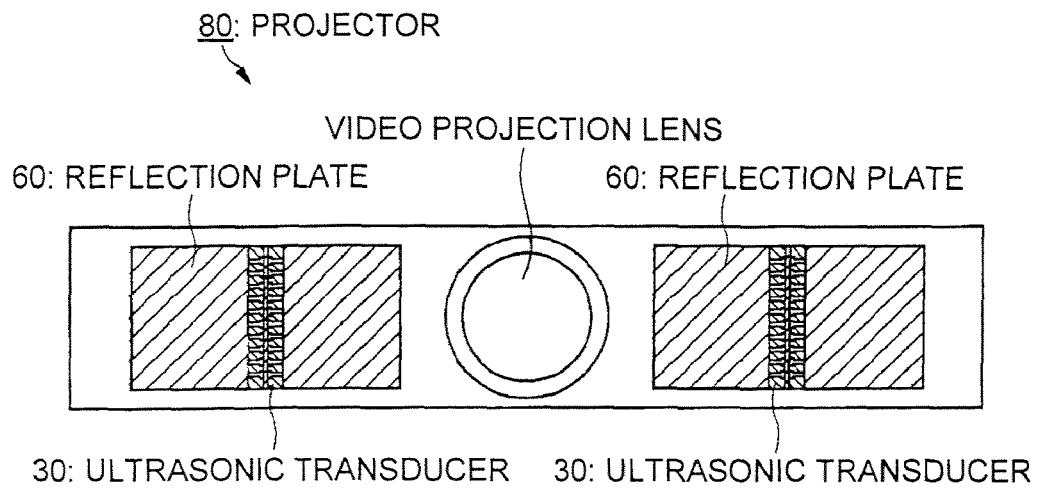
FIGS. 6A and 6B are views showing examples where the ultrasonic speakers of the invention are incorporated into a projector.
Figure 6B:
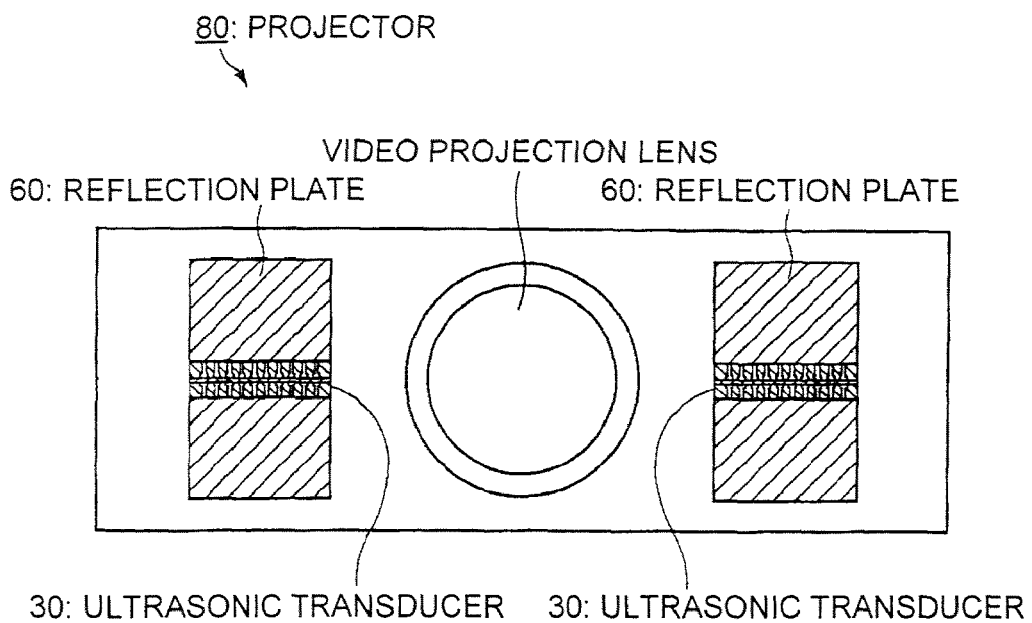

FIGS. 6A and 6B are views each showing an example when the ultrasonic speakers of the invention are incorporated into a projector, and each shows an example of a projector furnished with a stereo playback function using two ultrasonic speakers on the right and left. As shown in FIGS. 6A and 6B, the ultrasonic speakers, each comprising the ultrasonic transducer 30 and the reflection plates 60 in a size (width and height) corresponding to the size of a projector 80, can be readily incorporated into the projector 80 when they are installed in a vertical or horizontal posture.

FIG. 6A shows an example where the ultrasonic speakers are disposed in such a manner that the sound wave output surfaces of the ultrasonic transducers 30 are set in the top-to-bottom direction of the projector 80. FIG. 6B shows an example where the ultrasonic speakers are disposed in such a manner that the sound wave output surfaces of the ultrasonic transducers 30 are set in the left-to-right direction of the projector 80.

When configured in this manner, it is also possible to fold the reflection plates 60 for the ultrasonic speakers to be collapsed in an extremely narrow space within the projector 80.

Figure 12A:
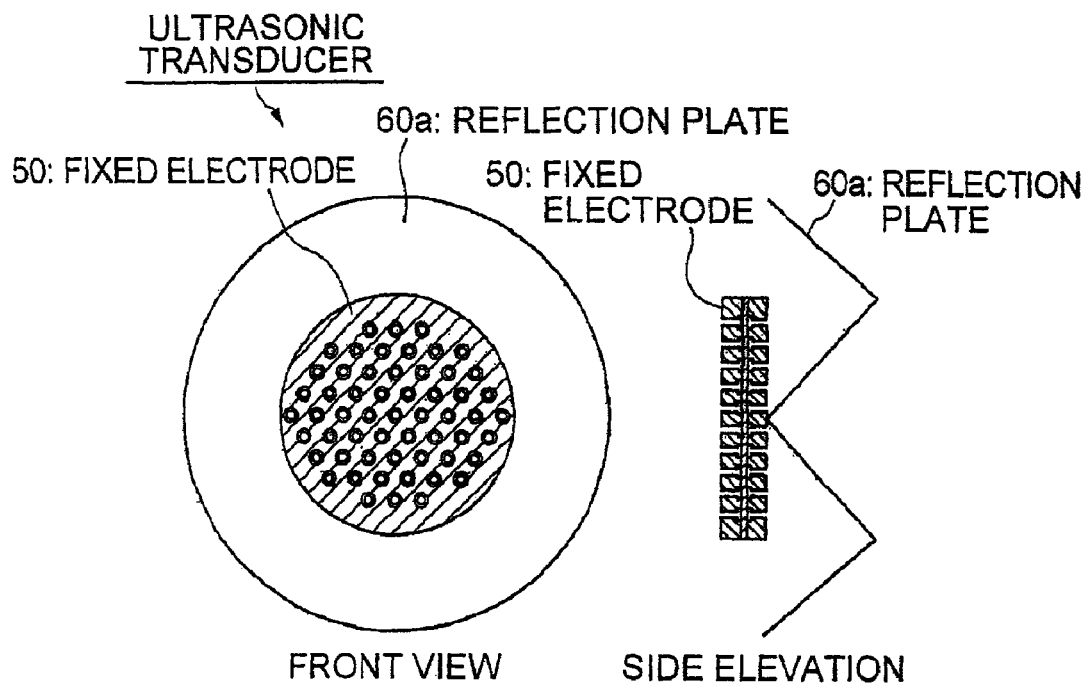
FIGS. 12A and 12B are other views used to describe the example in the related art.
Figure 12B:
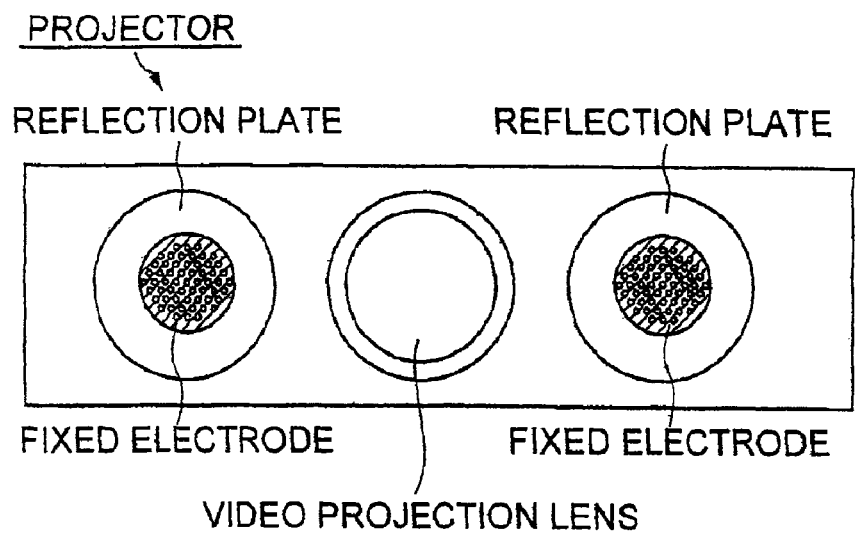

In the incorporation mode in the related art (see FIG. 12B showing the example in the related art), ultrasonic speakers of a circular shape are incorporated into the projector in a standing posture with the sound wave output surfaces facing toward the front. The reflection plates used therein therefore need a diameter twice as large as the diameter of the ultrasonic transducer, which makes it difficult to fold the reflection plates. This poses a problem that the projector is increased in size or outputs of the ultrasonic speakers are insufficient.

Figure 7A:
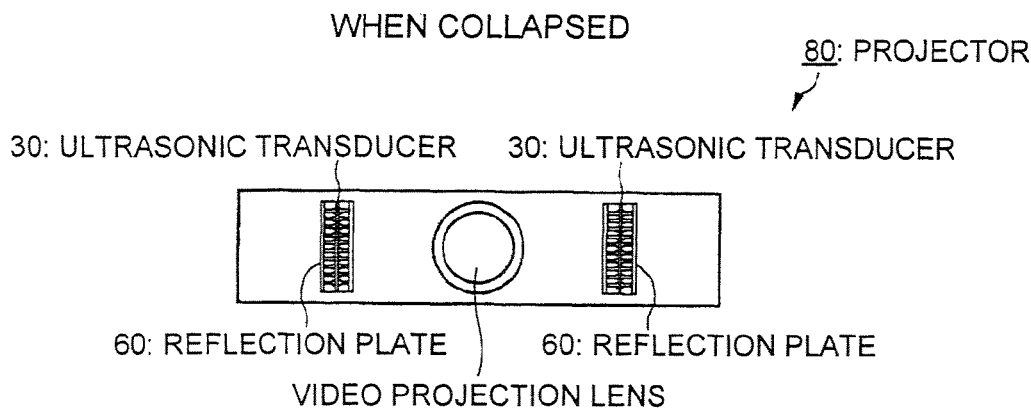
FIGS. 7A through 7C are views showing the ultrasonic speakers of the invention in a collapsed state and in use states.
Figure 7B:
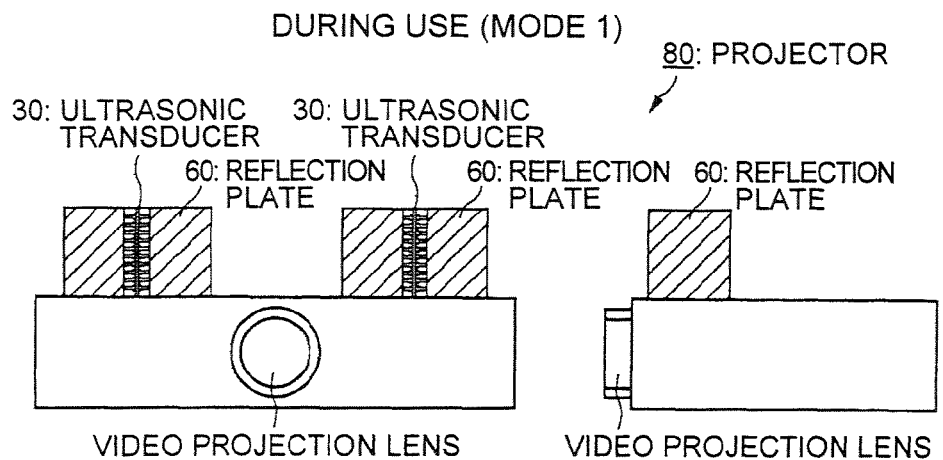
Figure 7C:
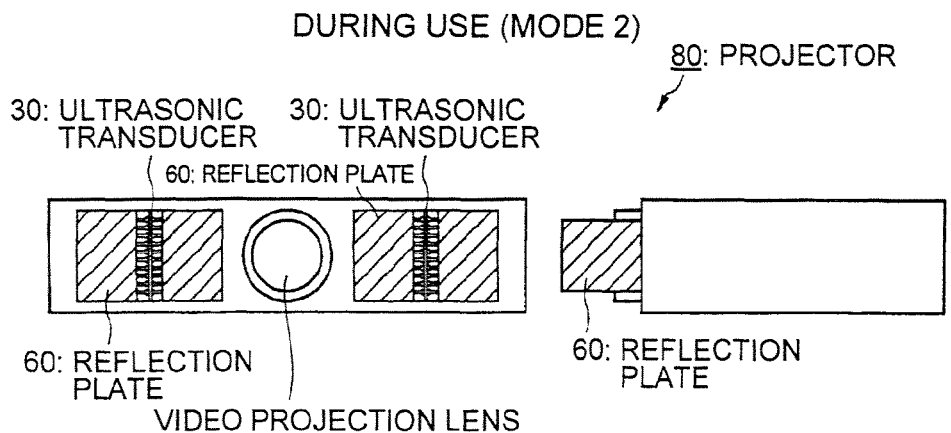

FIGS. 7A through 7C show a collapsed state and use state of the ultrasonic speakers of the invention, and they show an example of a projector furnished with a stereo playback function using two ultrasonic speakers on the right and left. As shown in FIGS. 7A through 7C, the configuration of the invention allows the reflection plates 60 to be folded when the ultrasonic speakers, each comprising the ultrasonic transducer 30 and the reflection plates 60, are collapsed in the projector 80. The ultrasonic speakers can be therefore of a compact size, and the projector 80 will not be increased in size. During use, the reflection plates 60 are unfolded at the same time when the ultrasonic speakers protrude by sliding toward the top surface or the front surface of the projector 80.

Figure 8:
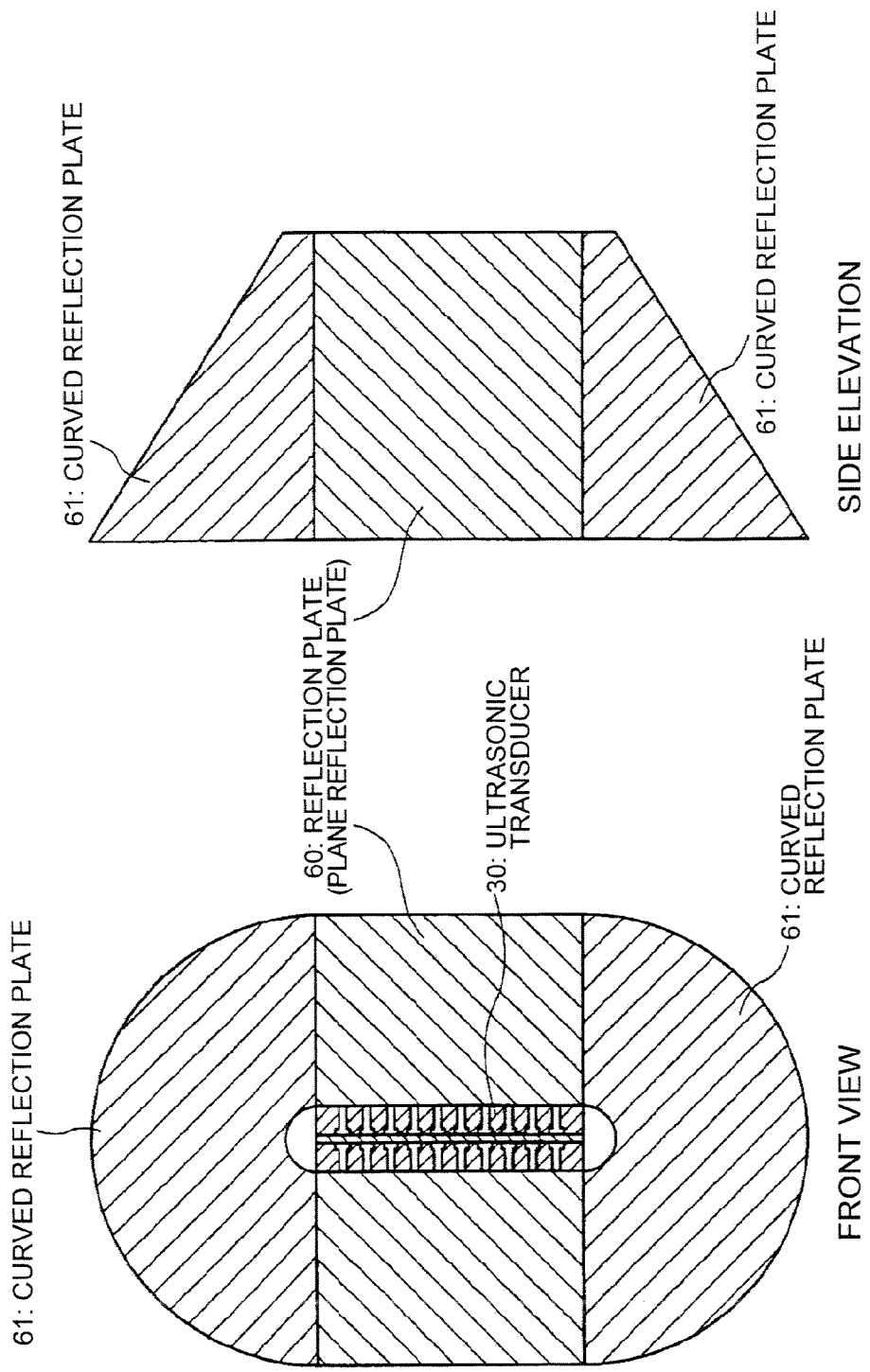
FIG. 8 is a view showing an example where curved reflection plates are additionally provided to the ultrasonic transducer.

FIG. 8 is a view showing an example where curved reflection plates are additionally provided to the ultrasonic transducer. When the reflection plates are flat plates, part of sound waves emitted from the ultrasonic transducer fail to go incident on the reflection plates perpendicularly, and such sound waves are reflected in a vertical direction instead of being emitted forward by reflection. However, as is shown in FIG. 8, by additionally providing curved reflection plates (a conical shape is preferable) 61 to the reflection plates (plane reflection plates) 60, components, which have been reflected on the reflection plates (plane reflection plates) 60 in a direction shifted from a desired direction (forward), can be reflected forward on the curved reflection plates 61.

Figure 9A:
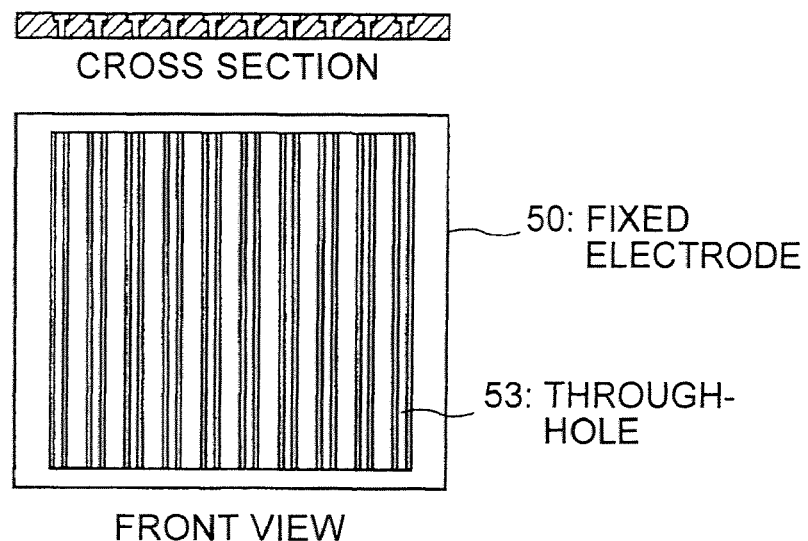
FIGS. 9A through 9C are views showing examples of a shape of a fixed electrode and a shape of through-holes.
Figure 9B:
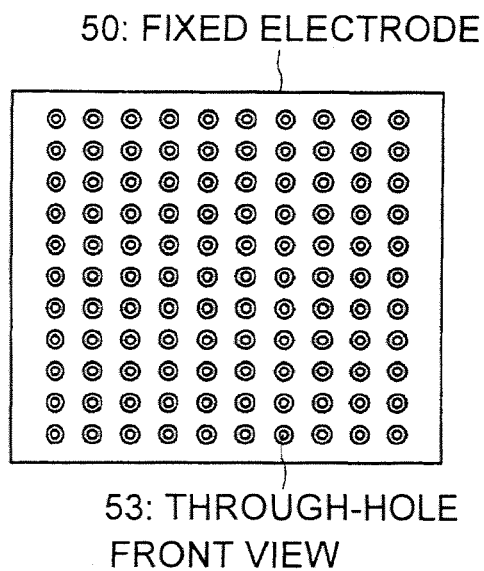
Figure 9C:
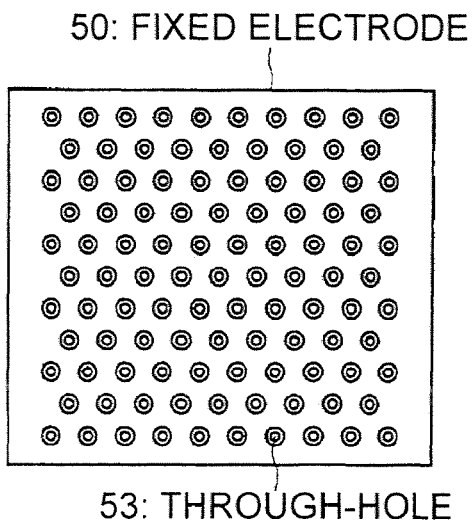
Figure 11A:
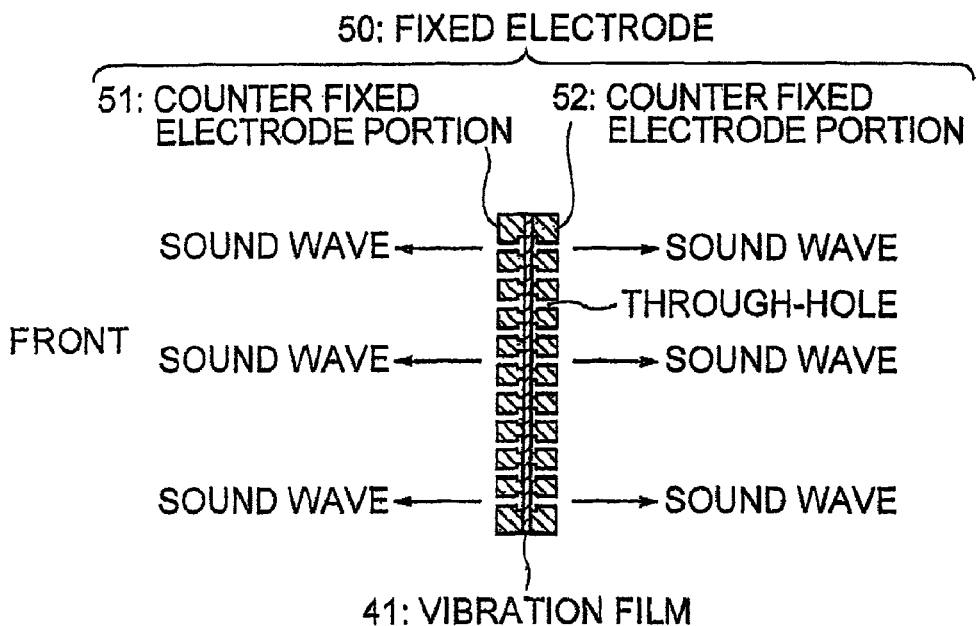
FIGS. 11A and 11B are views used to describe an example in the related art.
Figure 11B:
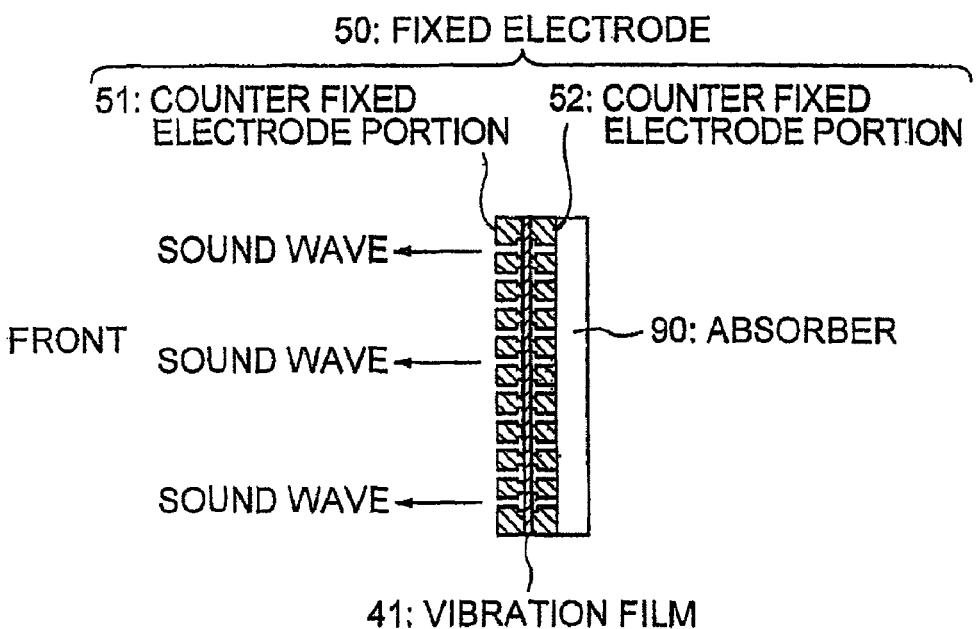

FIGS. 9A through 9C are views showing examples of a shape of the fixed electrode and a shape of through-holes. In the configuration of the invention, the fixed electrode 50 can be of a circular, elliptical, or rectangular shape; however, a square as is shown in FIGS. 9A through 9C is preferable in terms of area efficiency. The through-holes 53 can be of a circular, elliptical, or a rectangular shape, too, and they can be aligned linearly, in a honeycomb fashion, or concentrically.

FIG. 9A shows an example where the fixed electrode 50 is formed in a rectangular shape, and rectangular through-holes 53 are aligned in parallel. FIG. 9B and FIG. 9C show an example where circular through-holes 53 are provided.

As has been described above, the ultrasonic speaker of the invention is able to emit sound waves on both sides in a state producing as small a phase difference as possible by providing the reflection plates on the sides of both sound wave output surfaces of the push-pull ultrasonic transducer at an angle of 45 degrees. Sound waves on one side, which are not utilized and discarded in the related art, can be thereby utilized in addition to those on the other side, which can in turn enhance output sound pressures. Also, by installing the ultrasonic speakers in a vertical or horizontal posture, the ultrasonic speakers can be collapsed in the projector efficiently. Further, because the reflection plates can be folded, the ultrasonic speakers can be readily collapsed in the projector.

While the embodiments of the invention have been described, it goes without saying that the ultrasonic speaker of the invention is not limited to those examples shown in the drawings, and can be modified in various manners without deviating from the scope of the invention.

What is claimed is:

1. An ultrasonic speaker, comprising:
an ultrasonic transducer including:
a first sound wave output surface; and
a second sound wave output surface, that is opposite from and substantially parallel to the first sound wave output surface;
a first sound wave reflection plate, that is disposed at an acute angle with respect to the first sound wave output surface;
a second sound wave reflection plate, that is disposed on opposite sides of the ultrasonic transducer from the first sound wave reflection plate, the second sound wave reflection plate being disposed at an acute angle with respect to the second sound wave output surface;
a moving mechanism operable to selectively move at least one of the first and second sound wave reflection plates relative to at least one of the first and second sound wave output surfaces; and
a controller that calculates and controls an amount of movement for the moving mechanism to move the at least one of the first and second sound wave reflection plates relative to the at least one of the first and second sound wave output surfaces, the amount of movement calculated based on a wavelength of sound output by the ultrasonic speaker.

2. The ultrasonic speaker according to claim 1, further comprising:
a curved reflection plate that reflects sound wave components, which have been reflected on at least one of the first and second sound wave reflection plates.

3. The ultrasonic speaker of claim 1, the ultrasonic transducer further including a vibration film, wherein the first and second reflection plates are disposed in respective planes that intersect each other, at an intersection, and wherein the vibration film is disposed in a plane that approximately intersects the intersection.

4. The ultrasonic speaker of claim 1, further comprising a carrier signal source that generates a carrier signal for outputting sound from the ultrasonic speaker, wherein the amount of movement correlates to approximately half of a wavelength of the carrier signal.

* * * * *